United States Patent [19]

Glassman

[11] Patent Number: 4,647,748
[45] Date of Patent: Mar. 3, 1987

[54] GRAPHITE ELECTRODE CONSTRUCTION AND METHOD OF MAKING

[75] Inventor: Anthony F. Glassman, Norco, Calif.

[73] Assignee: Smith International, Inc., Newport Beach, Calif.

[21] Appl. No.: 818,040

[22] Filed: Jan. 13, 1986

Related U.S. Application Data

[63] Continuation of Ser. No. 611,466, May 17, 1984, abandoned.

[51] Int. Cl.$^4$ .............................. B23P 1/08; B23P 1/12
[52] U.S. Cl. ................................ 219/69 E; 219/69 R; 219/119; 29/592 R
[58] Field of Search ...................... 219/69 E, 69 R, 68, 219/118, 119; 313/326, 334; 29/592 R

[56] References Cited

U.S. PATENT DOCUMENTS

| | | | |
|---|---|---|---|
| 3,125,665 | 3/1964 | Snider | 219/69 E |
| 3,591,822 | 7/1971 | Katz | 313/334 |
| 3,783,224 | 1/1974 | Schroeder | 219/69 E |
| 3,846,611 | 11/1974 | Fedjukin et al. | 219/69 E |
| 4,156,327 | 5/1979 | O'Connor | 219/69 E |
| 4,245,144 | 1/1981 | Wittenstein et al. | 219/69 E |

FOREIGN PATENT DOCUMENTS 57-54031  3/1982  Japan .................................. 219/69 E

*Primary Examiner*—M. H. Paschall
*Attorney, Agent, or Firm*—Price, Gess & Ubell

[57] ABSTRACT

Electrical Discharge Machining (EDM) utilizes electrodes made out of carbon, for example, in place of cutting tools. The shape of the electrode determines the shape of the part being machined. The EDM process wears down the carbon electrode cutting tool. By adhering fresh carbon material to the base of a carbon electrode as it wears down with a graphite and metallic powder-filled adhesive, the electrode can continue to be resurfaced indefinitely, thereby eliminating waste. In order to hold the carbon electrode more securely during initial shaping of the electrode, a metal base plate is used which is formed so that a portion of it fits into a cavity in the base of the carbon electrode. The carbon electrode is held fast to the metal base plate by countersunk bolts that engage threaded holds in the base plate. Flushing channels are provided through the metal base plate. Metal tooling clamps engage the metal base plate to hold it and the carbon electrode firmly against a tooling bed.

20 Claims, 15 Drawing Figures

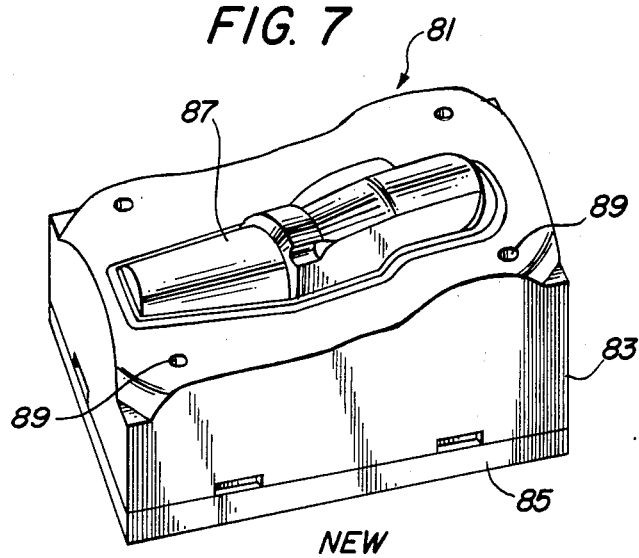
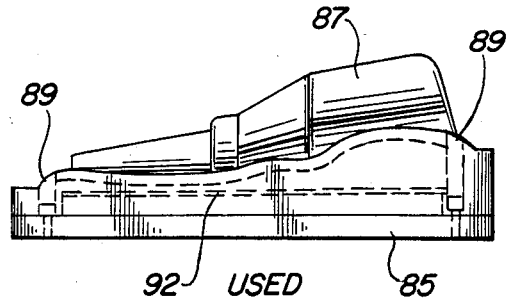
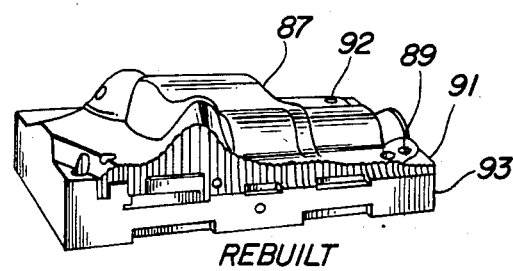
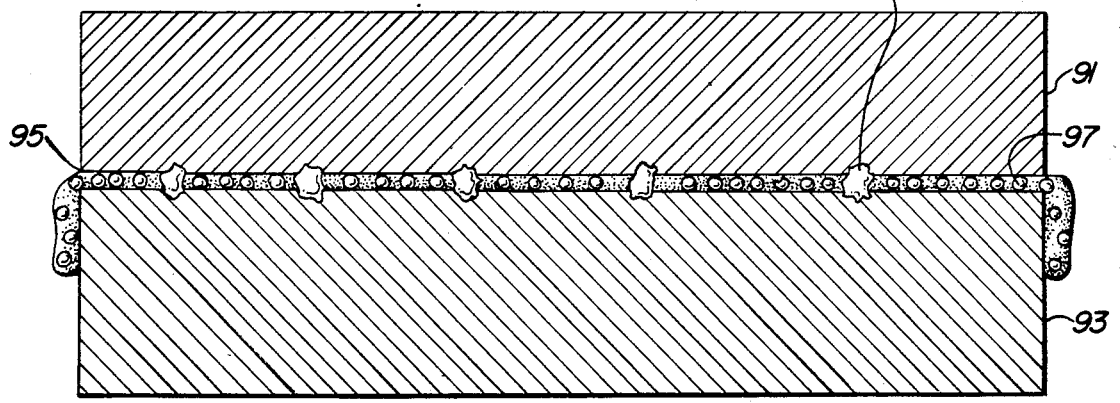

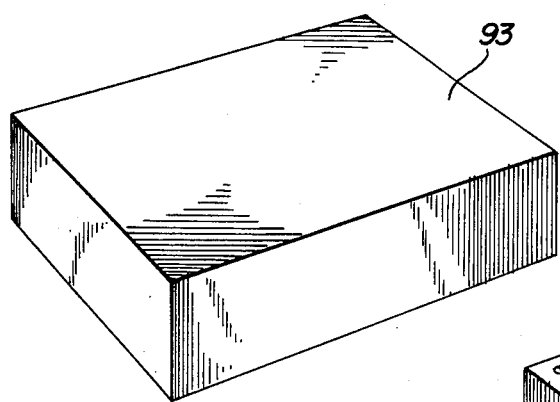
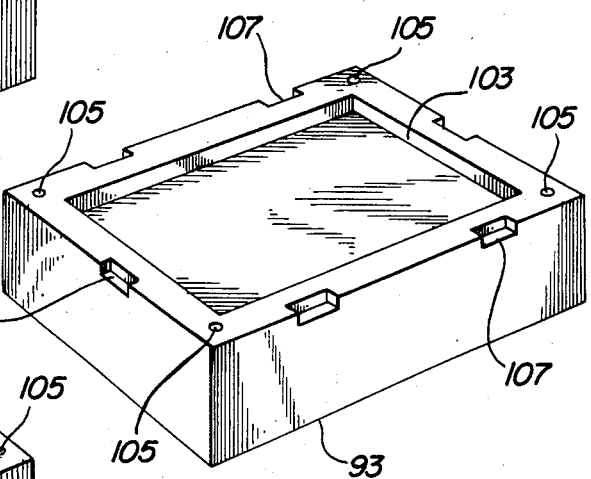
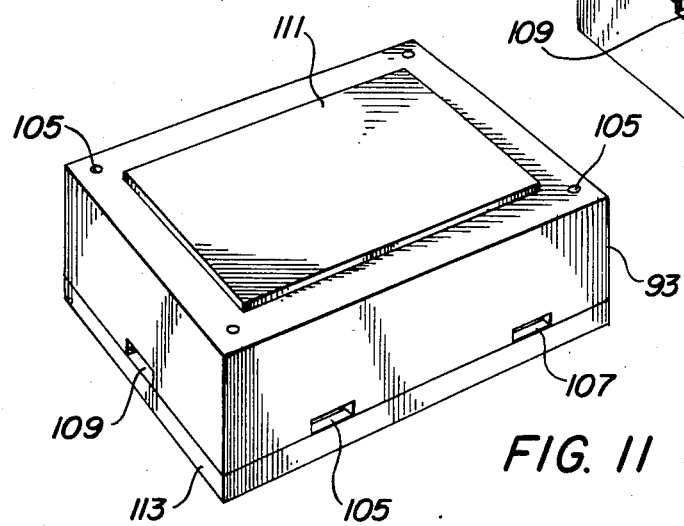
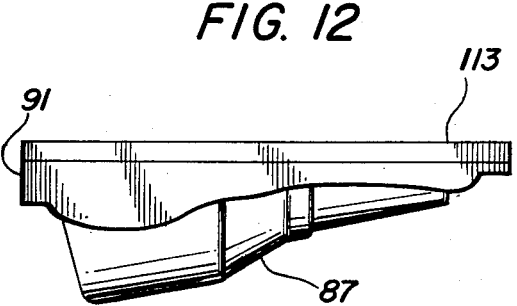
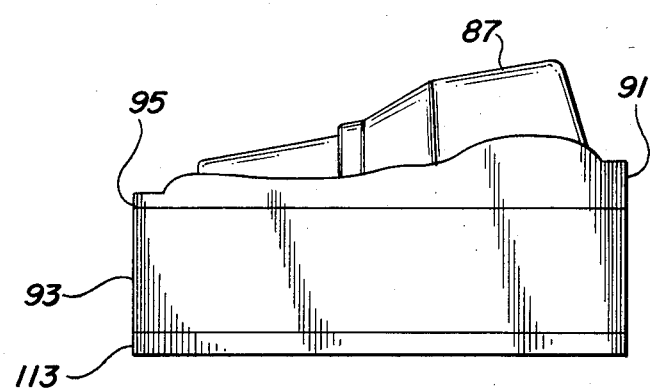

GRAPHITE ELECTRODE CONSTRUCTION AND METHOD OF MAKING

This is a continuation of application Ser. No. 611,466, filed May 17, 1984, now abandoned.

BACKGROUND OF THE INVENTION

1. Field of the Invention

The present invention relates generally to improvements in Electrical Discharge Machining processes, and more particularly pertains to new and improved graphite electrode constructions for use in such processes and methods of making such electrodes.

2. Description of the Prior Art

Electrical Discharge Machining (EDM) is considered a nontraditional machine process because there is no tool force utilized. The cutting tool is actually an electrode. This tool never touches the workpiece. EDM processes require that both the electrode and the workpiece must be made of materials that conduct electric currents. The electrode is merely a platform from which sparking originates. The shape of the electrode determines the shape of the part being machined. EDM can be analogized to lightning in some aspects. The sparking in an EDM process, unlike lightning, however, is very controlled. The electronic power source controls the spark time on in microseconds and the spark time off in microseconds, as well as the peak power of each spark. During the sparking process, electrons move from the electrode to the workpiece. These electrons represent the force which causes the metal in the workpiece to be removed. When the electrons strike the surface of the workpiece they release their energy in the form of heat. Actually three conditions happen at the point of impact by an electron on the surface of the workpiece. These conditions are: heating of a very small portion of the surface where the electron bombardment impacts the workpiece surface, melting of the workpiece as a result of this bombardment, and ultimately continued heating of the workpiece to the point of surface vaporization. Each spark removes a very small amount of workpiece material.

During the 1960's EDM processes utilized only copper electrodes. These copper electrodes were produced by conventional means such as turning, milling, grinding or drilling. Most of the time, due to the difficulties of machining these materials, the electrode cost was at least equal to the workpiece machining cost. EDM users rapidly came to the conclusion that EDM could progress only with the help of a new technology which allowed an economical production of complex shaped electrodes and followed a set of procedures that can be indefinitely repeated.

Although even today there are many die shops that restrict themselves to the use of copper electrodes, especially for fine stamping dies, graphite has become more popular. Graphite is easily machined by conventional processes, although there are problems due to its fragility. Methods have been developed that yield good quality electrodes. Abrasive methods such as Total Form Machining (TFM) have been used successfully to provide good quality graphite electrodes.

In practice, the metallic electrode in an EDM process can accept a shorter off time or a higher duty cycle than a graphite electrode. As a rule of thumb, the more complex and difficult the electrode, the greater the off time or smaller the duty cycle should be. Although if the electrode is well flushed, then the off time can be reduced considerably. In other words, the duty cycle can be increased. The object in obtaining the optimum duty cycle is to achieve the shortest off time, highest duty cycle, because by reducing the off time and increasing the duty cycle, the metal removal rate increases while the wear on the electrode diminishes.

In most instances the electrode is the cathode and charged negatively, while the workpiece is an anode and charged positively. The use of negative polarity has its advantages, especially with graphite electrodes, because the metal removal rate is double the rate for an electrode graphite that is charged positively. However, the wear on the electrode in this mode is also increased considerably. It is quite possible that the wear in a negative polarity graphite cathode can be up to ten times higher. The negative polarity graphite electrodes find a particular useful application in large molds or forge dies, where the electrodes can be produced economically on an abrading machine, often called TFM. This application does not increase substantially labor-intensive charges for the electrodes and the higher metal removal rate obtained by the negative polarity is a great advantage.

The prior art has used many ways of holding a graphite electrode, for example, a base plate, a shaft or a collet. Metal electrodes, for example, have been held by screwing, soldering or brazing. A more recent technique is to use adhesive instead of brazing. Conductive adhesives have been used for this purpose. These adhesives, known as two-component adhesives, are charged with graphite or silver. The prior art, however, especially when large electrodes are used, recommends the use of a very thick layer of glue, in addition to screwing the electrode to a base plate, if used, in order to ensure positive electrical conductivity.

In spite of considerable advancement in the art of EDM in the areas of forming the graphite electrode by Total Form Machining and in the use of such electrodes, problems still remain. It was common practice, prior to the present invention, when forming the cathode electrode out of a graphite block by TFM to hold the block in place by the clamps available. These clamps engaged the graphite directly through slots in the sides of the graphite block.

This type of holding system caused the graphite to collapse and break from beneath the clamps during the machining process, allowing the electrode to bang against the tooling bars. The net result was damage to both the tooling bars on the machine bed as well as the electrode being formed. If the broken graphite exceeded two inches in height, the entire electrode would have to be scrapped, and at the very least the break would have to be re-formed and the material resurfaced to fit the clamping system. All this caused a loss of time, material and money. The present invention eliminates this problem.

One aspect of the present invention is to provide a base plate for the graphite block which attaches to the electrode, is readily interchangeable therewith, and takes the force of the holding clamps on the tooling bed. Use of these base plates eliminates slippage of the graphite block during the TFM process. The clamping system with the use of the base plate adds an additional 2 inches of usable graphite to the block thickness because this new clamping technique only utilizes 1½ inches of graphite at the base rather than the 3½ inches which was required. This additional usable graphite extends the life of the electrode being formed.

Another problem that existed in the prior art, prior to the present invention, was the creation of scrap graphite resulting from the electrode wearing down too close to its base plate. As was noted earlier, a negatively charged cathode exhibits considerable wear during the EDM process. This wear is compensated for by re-forming the cathode by the TFM process. Each time the electrode is re-formed, the graphite cathode drops further down towards its base until the graphite block is worn down to the point where there is no longer sufficient graphite left for the re-forming. At this point, there is still a considerable amount of graphite left.

For example, making a cathode out of a rough graphite block that costs about $800.00 would leave a scrap electrode after its useful life which still had graphite in it worth about $480.00. In the past, the scrap electrodes were simply thrown away. The present invention puts these electrodes back to use by simply adhering a new block of graphite to its base. This is done without the use of screws or electrode straps, in a manner that provides for electrical continuity between the adhered electrode and the new base block. The procedure extends the life of a graphite electrode indefinitely, as long as it is desired to stack the electrode on a new base block.

SUMMARY OF THE INVENTION

The problems of the prior art have been eliminated by the improved graphite electrode construction and method of making it according to the present invention. Gluing fresh blocks of graphite to the base of formed electrodes allows such electrodes to be resurfaced indefinitely, thereby eliminating the waste prevalent in the prior art. Using a graphite metal powder-filled adhesive to glue the two blocks of graphite together eliminates the arcing prevalent in prior art laminated graphite electrode devices. In order to hold the graphite electrode fast during the shaping process a metal base plate is formed so that a part of it fits into a recess in the base of the carbon block. Flushing channels are provided through the base plate and the carbon electrode. The carbon electrode is held fast to the metal base plate by a plurality of countersunk bolts that engage threaded holes in the base plate. Metal tooling clamps engage the metal base plate to hold the electrode fast to the tooling bed.

BRIEF DESCRIPTION OF THE DRAWINGS

The objects and many of the attendant advantages of this invention will be readily appreciated as the same becomes better understood by reference to the following detailed description when considered in conjunction with the accompanying drawings in which like reference numerals designate like parts throughout the figures thereof, and wherein:

FIG. 7 is a perspective of a new graphite cathode electrode after it is first formed;

FIG. 8 is a side view of a used graphite cathode electrode after it can no longer be re-formed and is worn down to the point of scrap;

FIG. 9 is a block of graphite;

FIG. 10 is a perspective illustrating the bottom of a block of graphite having machined therein the cavity for engaging a base plate;

FIG. 11 is a perspective of the block of graphite showing how the top of the graphite block is machined to engage the base of the old graphite electrode;

FIG. 12 is a side perspective of the old graphite electrode;

FIG. 13 is a side view of the old graphite electrode stacked on top of the back graphite block;

FIG. 14 is a cross-section showing the junction between the graphite electrode and the graphite block and the adhesive material that joins the two together; and FIG. 15 is a perspective showing a rebuilt electrode placed on top of a new base block.

DESCRIPTION OF THE PREFERRED EMBODIMENTS

Figure 1:
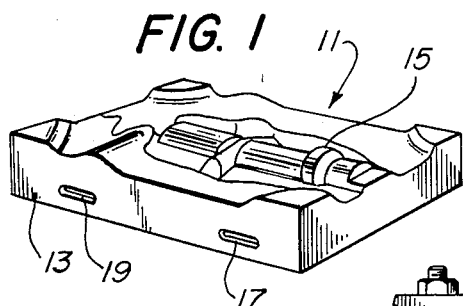
FIG. 1 is a perspective illustration of a graphite electrode manufactured according to the prior art.
Figure 2:
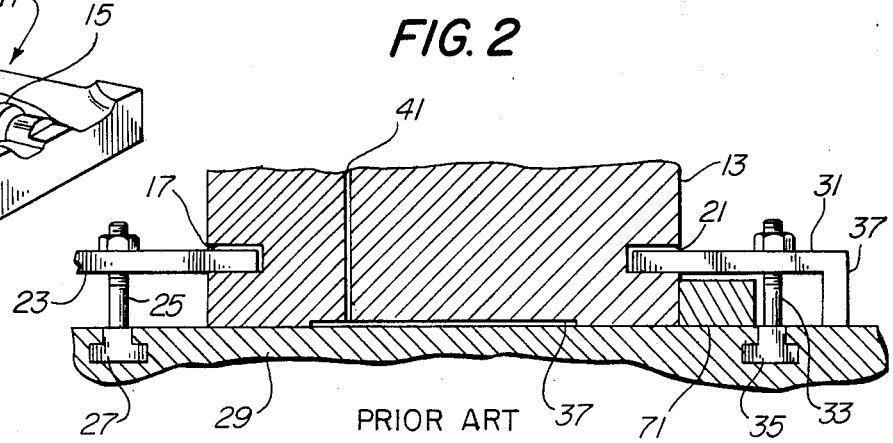
FIG. 2 is a cross-sectional view of the prior art graphite electrode of FIG. 1.

Referring first to FIGS. 1 and 2, the prior art technique for holding a graphite electrode to a work table for the purpose of forming it is illustrated. The formed graphite electrode 11 is shown in FIG. 1. It is formed out of a graphite block 13 with a contoured surface 15 on one face thereof. This contoured surface determines the shape of the machined part. Slots 17, 19 are placed around the sides of the block for the purpose of receiving clamping bars to clamp the graphite block on a work table 29 (FIG. 2).

Referring now to FIG. 2 specifically, the prior art clamping technique is illustrated. The clamping bars 23 and 31 fit within the recesses 17 and 21 of the carbon block 13 itself. The distance between the slots 17 and 21 and the top of the tooling table 29 can vary up to four inches, depending upon the size of the block. All the carbon material below the slots is totally useless for purposes of forming a cathode electrode therein. The clamping bars 23 and 31 are held to the table 29 by way of bolts 25 and 33, for example, which attach to the tooling table 29 by way of the heads thereof (not shown) fitting within T slots 27 and 35 in the table. The standard structure for a clamping bar 31 ensures that excessive pressure is eliminated by the vertical rectangular extension 37 which contacts the top of the tooling table. A tooling bar 71, as is well known in the art, helps locate the workpiece on the table 29. A flushing manifold 37 and a flushing hole 41 is shown as an illustration of the mechanism used for flushing the electrode during manufacture or formation thereof and during actual use.

Figure 3:
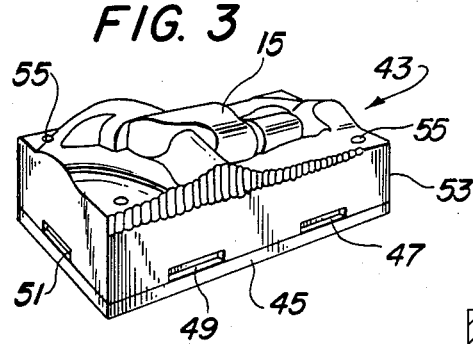
FIG. 3 is a two-part perspective of a graphite cathode manufactured according to the present invention.

The base plate of the present invention is a considerable improvement over the prior art structure shown in FIGS. 1 and 2 as is readily evident from viewing FIG. 3. The graphite electrode 43 is shown mounted on a base plate 45 according to the present invention. The contoured cathode surface 15 is on a major face thereof. The base section 53 of the graphite block is considerably larger than the large section of a prior art cathode. The slots 47, 49 and 51 that are located around the periphery at the base of the graphite block 53 are cut at the very bottom of the block 53 so that a portion of the metal plate 45 is exposed. The graphite cathode is held to the base plate 45 by way of bolts 69 (FIG. 4) which are countersunk through the top or contoured face 15 of the electrode at the corners 55 thereof, or spaced in a pattern, as is dictated by the contour of the electrode and the formation requirements.

Figure 4:
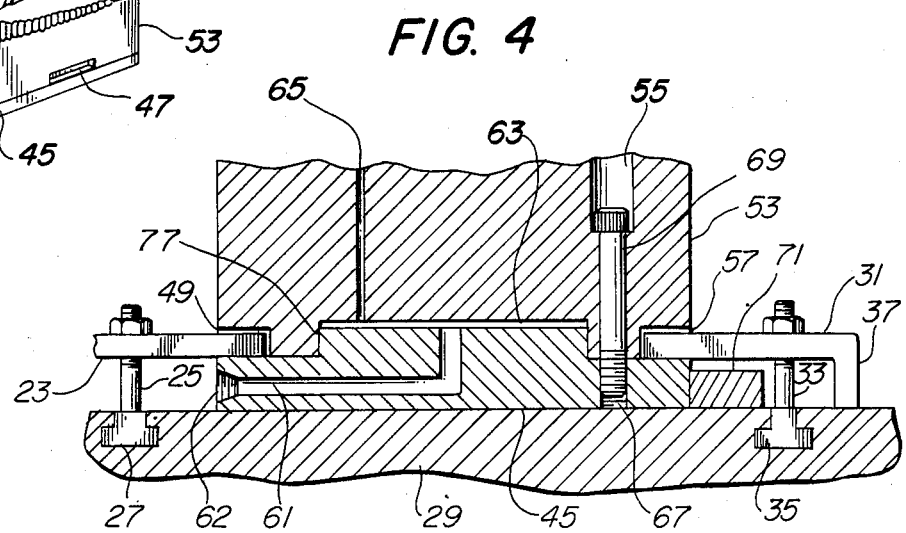
FIG. 4 is a perspective of the graphite cathode electrode of FIG. 3 showing how the tooling clamps engage the base plate.

Referring now to FIG. 4, the clamping mechanism facilitated by the base plate 45 is more clearly illustrated. The carbon block 53 is held to the base plate 45 by way of a plurality of machine bolts 69 that are countersunk in holes 55 in the face of the block 53 and engage threaded holes 67 in the base plate itself. The base plate 45 is preferably constructed from aluminum and sized to match the confirmation of the base of the block 53.

Use of the base plate 45 has two immediate advantage that are quite obvious from FIG. 4 and another advantages not immediately apparent, but equally important. That is, the tooling bar 71 no longer contacts the carbon block 53 and the clamping bars 23 and 31 no longer contact the carbon block 53. Both these holding elements now directly contact the base plate 45 to hold it fast to the tooling table 29. The threaded bolts 69 in turn hold the carbon block fast to the base plate 45. The bolts 69 preferably have Allen head slots in their heads for driving the bolts down into the threaded holds in the base plate 45. This arrangement virtually eliminates any damage to the tooling bars 71 or the carbon block.

The base plate 45 has a plateau 77 thereon which matches the recess 63 formed in the base of the carbon block 53 with an additional space left over as a flushing header to provide fluid to the various flow channels 65 through the carbon block. Flushing fluid is provided to the header portion of the recess 63 through the base plate 45 itself by way of fluid flow channel 61 which has an internally-threaded opening 62 for threadably receiving a connector.

Besides eliminating the forces that were being exerted on the carbon block during the TFM process used to shape the electrode, the base plate 45 has added up to 4 inches of usable carbon to the contoured surface of the electrode.

The advantage of the base plate 45 that is not readily apparent is its interchangeability. The fact that one base plate can be used to form many carbon electrodes of various sizes allows one to keep a small inventory of base plates. The result is a considerable cost saving in the electrode fabrication process.

Figure 5:
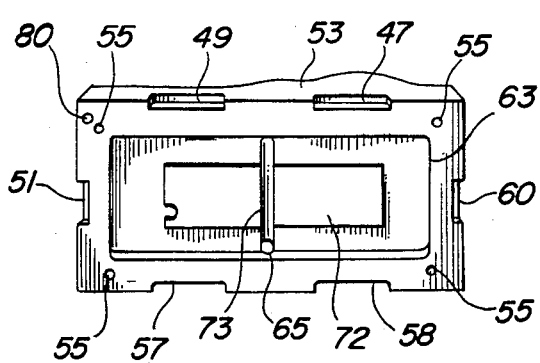
FIG. 5 is a bottom perspective of the graphite electrode of FIG. 3 with the base plate removed.
Figure 6:
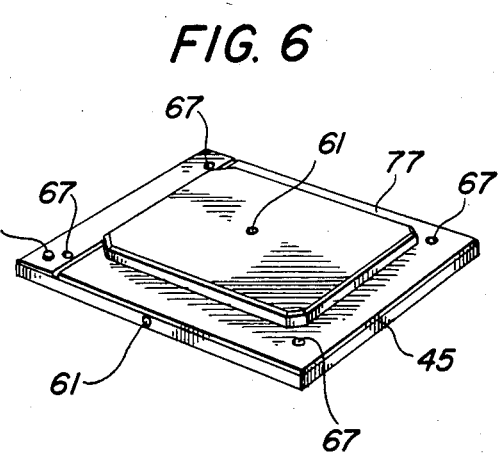
FIG. 6 is a perspective of the base plate of FIG. 3 by itself.

Referring now to FIGS. 5 and 6, the underneath or base portion of the carbon block 53 is more clearly illustrated in FIG. 5. The mating portions of the base plate 45 is illustrated in FIG. 6. The carbon block 53 must be formed at its base so that a recess 63 is formed therein in addition to the clamping slots 49, 47, 60, 58, 57 or 51 around the edges of the base of the block 53. The recess 63 is formed at a desired depth, leaving a platform 72 therein that is slightly raised from the recess 63, thereby ensuring that the recess 63 acts as a header for the plurality of flushing channels, such as 65, that go through the carbon electrode to its contoured face. A horizontal groove 73 cuts through the platform 71 to ensure even distribution of the flushing fluid surrounding the plateau 71 in the recess 63.

When the electrode is mounted on the base plate, the platform 72 rests directly on the plateau 77 of the base plate 45. A plurality of bolt holes are shown coming through the electrode from the face to its bottom portion 55. These holes 55 are preferably at the corners of the electrode block 53 out of the way of the contoured face of the electrode itself. In addition, the bottom of the carbon block has an aperture 80 therein to receive a locator pin 79 which is on the base plate 45.

As can be seen from FIG. 6, the base plate 45 is essentially a rectangular plate of aluminum with a plateau 77 having edges parallel with the first plate and centered on that plate. There is a plurality of threaded holes 67 on the base plate itself to receive the bolts which function to hold down the carbon electrode. These holes may be located at various places and could, for example, be located at equally spaced intervals around the perimeter of the plateau 77. A locator pin 79 in one corner of the base plate helps to locate the carbon block once its bottom is formed with the appropriate recess 63 on the plateau 77. A flow-through channel 61 opening at one edge of the base plate 45 and in the center of the plateau 77 provides an egress of flushing fluid which is utilized during the electrode forming process and during the EDM process.

A new graphite cathode electrode for EDM purposes is illustrated in FIG. 7. The cathode electrode 81 has a contoured face 87 which dictates the form of the workpiece. A good deal of carbon base 83 is provided beneath the contoured surface 87. The entire carbon electrode is held fast to the base 85 according to the present invention by way of bolts countersunk in holes 89.

As the electrode is used and it wears down, it is continuously resurfaced by TFM or other applicable machining processes until eventually the carbon 91 left beneath the face 87 is to the point where the base of the contour is breaking into the flush pocket or recess in the base of the carbon electrode. The electrode illustrated in FIG. 8 has been used to the point where it has to be scrapped. The contoured shape is breaking into the flush pocket at 92.

Rebuilding the electrode of FIG. 8 by the process according to the present invention results in the addition of new carbon 93 to the base of the contour 87. The rebuilt electrode looks like the one illustrated in FIG. 15.

The process of rebuilding occurs as follows. A carbon block 93 (FIG. 9) is formed to be the same shape as the base of the electrode 91 to be rebuilt. One face of the carbon block is carved out to have a recess 103 which forms the flush header as well as receives the plateau of the base 113. The block is also provided with holes 105 in the corners thereof to receive the bolts that will hold it down to the base plate 113. The corners of the block 93 at its bottom are carved out as in 107 and 109 around the perimeter of the base for the purpose of allowing the clamps access to the base plate 113.

Referring now to FIG. 11, the opposite side of the block 93 is formed to have a slight rise or plateau 111 thereon which matches the aperture that recesses in the electrode 91 (FIG. 12) with the base plate removed. Once the bottom portion 93 of the rebuilt carbon electrode is formed as shown in FIG. 11, the used carbon electrode 91 is adhered to the base portion 93 so as to form a new carbon electrode, as illustrated in FIG. 13. The adhesive bond 95 between the top layer of the electrode 91 and the base layer 93 provides a trouble-free, nonarcing bond if the process according to the invention is followed.

An adhesive paste is used to bind the cathode electrode 91 to the new carbon base 93. It is critical, however, that this adhesive paste be a very good conductor of electricity, otherwise considerable arcing and damage to the electrode will occur. Mixing the epoxy glue which can withstand up to 400° C. in a 1:1 ratio with graphite dust provides such an adhesive paste. It has been found that a graphite-filled epoxy paste manufactured by BJB enterprises, Inc. of Huntington Beach, California provides the strength and electrical continuity necessary for this application.

FIG. 14 is a general illustration of the bond that is formed when smaller area elements are being fastened together. A graphite-filled epoxy would hold the two pieces 91 and 93 together and provide sufficient electrical continuity between them if the spacing is sufficiently close so that the carbon particles 97 themselves contact both surfaces of the two pieces 91 and 93. To ensure that this occurs, the two pieces 91 and 93 being adhered together must be squeezed together as tightly as possible without damaging the two carbon pieces. The graphite-filled epoxy paste must be applied to both faces as thinly as possible, and yet provide an even distribution of paste thereon sufficient for adhesion.

For larger surfaces and to ensure a greater electrical continuity between the two pieces 91, 93 being glued together, one surface on one of the blocks being glued together should be sprinkled with a copper dust. When the two pieces 91 and 93 are clamped together the fine copper particles 99 embed themselves in both faces of the parts being glued together.

Having applied the graphite-filled epoxy, and having sprinkled copper dust on one face thereof and clamped the two pieces together as tightly as possible, the next step is to cure the adhesive paste so that a permanent bond between the upper part 91 and the lower part 93 is effected. The resulting bond will not interfere with the electrode shaping process.

A staged curing procedure is preferred. The entire clamp structure should be placed in an oven at a temperature of 150° C. for about one hour. The temperature is then raised and kept at 250° C. for two hours. In the third stage the temperature is raised to 325° C. for 1½ hours. After that 4½-hour period, the oven is shut off and the entire structure should be allowed to cool in the oven until its removal.

What has been described is an improved graphite electrode, and a method of making it for use in EDM processes which provides for considerable reduction of time and money and reduces the waste of carbon materials that was heretofore prevalent. It should be understood, of course, that the foregoing disclosure relates only to preferred embodiments of the invention and that modifications may be made therein without departing from the spirit and scope of the invention as set forth in the dependent claims.

What is claimed is:

1. A method of rebuilding and extending the life of a large carbon electrode used in the electrical discharge machining process after the face of the electrode has been resurfaced to the point where there is hardly any base material left, the process comprising:
    forming one face of a new base block of carbon to mate with a header configuration in the base of the carbon electrode to be built;
    removing a base plate from the base of the carbon electrode;
    attaching, without conductive adhesive, the base plate to the face of the new carbon block opposite the formed face;
    applying a thin layer of epoxy glue mixed with graphite dust to the base of the carbon electrode and the formed face of the carbon block;
    clamping the carbon electrode and carbon block together;
    curing the epoxy glue in an oven according to a staged schedule ; and
    releasing the clamping of the carbon electrode and carbon block.

2. The method of rebuilding a carbon electrode according to claim 1 wherein the electroconductive adhesive comprises an epoxy glue mixed in a 1:1 ratio with graphite dust.

3. The method of rebuilding a carbon electrode according to claim 1, further comprising, after the glue-applying step and before the clamping step, the step of sprinkling a fine copper dust over the epoxy glue.

4. The method of rebuilding a carbon electrode according to claim 1 wherein the curing step comprises the following staged schedule:
    a. One hour at 150° C.
    b. Two hours at 250° C.
    c. One and one-half hours at 325° C.
    d. Cooling in the oven 5. The method of rebuilding a carbon electrode according to claim 1 wherein the clamping step requires a force sufficient to bring the carbon electrode and carbon block together so that the graphite dust in the epoxy glue mixture comes into direct contact with the carbon electrode surface and the carbon block surface.

6. An improved carbon electrode construction for use in electrical discharge machining processes, comprising:
    a carbon electrode formed from a block of solid carbon having a face thereof shaped to a desired contour, a header configuration recessed into a base of the electrode opposite the contoured face, the base having a peripheral edge that defines a plurality of spaced apart slots capable of receiving, but without contacting, a plurality of clamping bars associated with a tooling table;
    a reusable, non-carbon base plate having a plateau thereon to mate with the recess in the base of the carbon electrode to form a flush header for the electrode, said base plate including a plurality of threaded holes therein around the periphery of the plateau and also having a peripheral edge opposite the slots of the carbon electrode that can frictionally engage the clamping bars; and
    a plurality of bolts countersunk in the face of the carbon electrode and passing therethrough to engage the threaded holes in the base plate, whereby the carbon electrode, without the use of conductive adhesives, is bolted to the non-carbon base plate, which in turn, may be clamped to the tooling table by the clamping bars that only engage the base plate.

7. An improved electrode construction of claim 6 wherein the base plate includes a channel therethrough from one side to the top of the plateau for fluid passage.

8. The improved carbon electrode construction of claim 7 wherein the base plate includes a locator pin thereon which mates with a locator hole in the carbon electrode.

9. The improved carbon electrode construction of claim 6 wherein the base plate is made out of aluminum.

10. The improved carbon electrode construction of claim 6 wherein said carbon electrode includes a plurality of notches around the periphery of its base for the purpose of permitting clamps to fully engage the base plate.

11. The improved carbon electrode construction of claim 6 wherein the recess in the base of the carbon electrode includes a platform therein that is smaller than the platform which contacts the base plate plateau.

12. The improved carbon electrode construction of claim 11 further including channels from the recess surface to the face of the electrode for flushing purposes.

13. A reusable base plate for
large carbon electrodes used in electrical discharge machining processes, the carbon block having a header configuration recess in its base with flushing channels extending therethrough into the header, said base plate comprising:
a hard, non-carbon flat plate joined to the base of the carbon block without the use of conductive adhesives, the plate being at least as large as the base of the carbon block to be formed into an electrode with a plateau integral with the flat plate, the plateau having a size and shape that fits into the header configuration in the recess in the base of the carbon block and also being positioned on the flat plate to define a peripheral edge around the entire plate to frictionally engage a plurality of clamping bars associated with a tooling table while freeing the carbon block from direct contact or stress from the clamping bars or tooling bars of the table when the clamping bars are so clamped, whereby the plate supports the carbon block and forms a header therein.

14. The base plate of claim 13 wherein the flat plate and plateau thereof are made from one solid piece of aluminum.

15. The base plate of claim 13 further including a channel from one side of the flat plate to the top of the plateau for passage of flushing fluid therethrough.

16. The base plate of claim 15 wherein the aperture of the channel at the one side of the flat plate is threaded.

17. The base plate of claim 13 wherein the flat plate includes a plurality of threaded holes surrounding the plateau for accommodating bolts passing through the carbon block.

18. The base plate of claim 17 further comprising a locator pin on the surface of the flat plate in one corner thereof.

19. The base plate of claim 13 wherein the plateau is centered on the flat plate.

20. The base plate of claim 19 wherein the edges of the plateau are parallel to the edges of the flat plate.

* * * * *